June 21, 1966     J. D. VAN SICKLE ET AL     3,256,942
FRAME FOR AGRICULTURAL IMPLEMENT HAVING
INDEPENDENTLY MOVABLE SECTIONS
Filed April 10, 1964     3 Sheets-Sheet 1
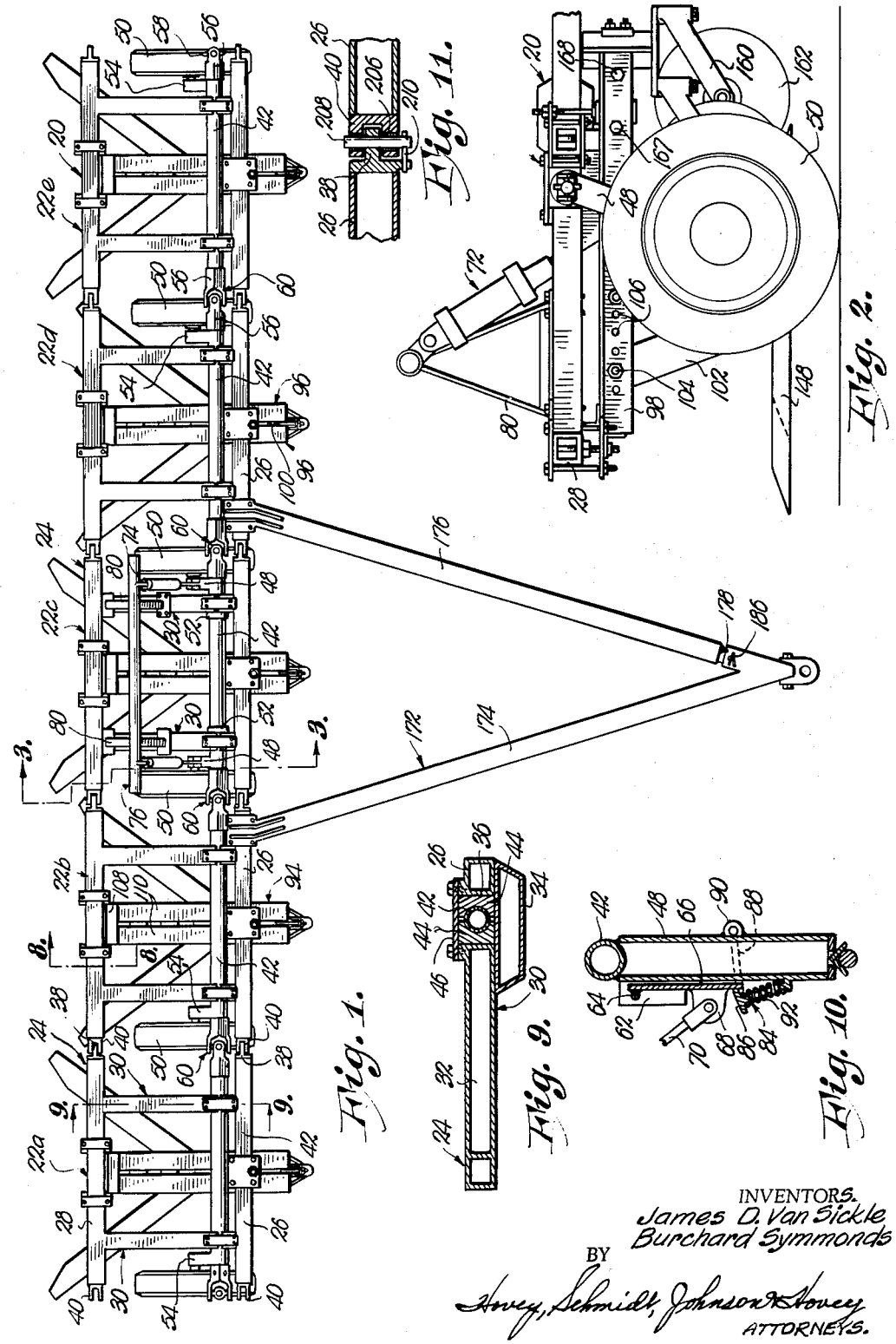
INVENTORS.
James D. Van Sickle
Burchard Symmonds
BY
Hovey, Schmidt, Johnson & Hovey
ATTORNEYS.

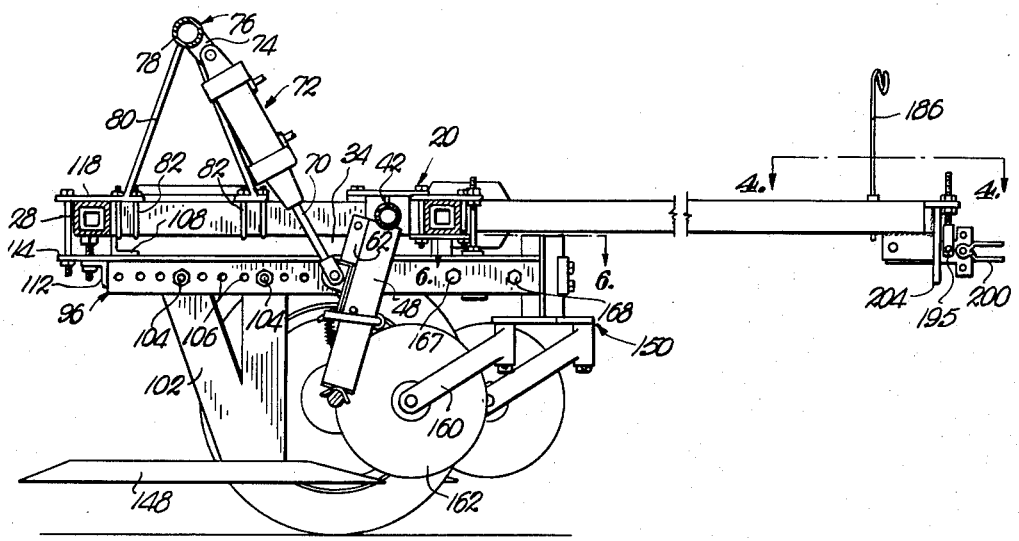

United States Patent Office 3,256,942
Patented June 21, 1966

3,256,942
FRAME FOR AGRICULTURAL IMPLEMENT HAVING INDEPENDENTLY MOVABLE SECTIONS
James D. Van Sickle and Burchard Symmonds, both of Cawker City, Kans., assignors to Richardson Manufacturing Company, Inc., Cawker City, Kans., a corporation of Kansas
Filed Apr. 10, 1964, Ser. No. 358,785
3 Claims. (Cl. 172—310)

This invention relates to agricultural implements and, more particularly, to sweep-blade plows. It has long been recognized that desirable results can be achieved in certain farming operations by tilling the soil with V-shaped sweep blades operated at relatively shallow depths beneath the surface of the earth for cultivating the soil and cutting off growing vegetation without removing the vegetation, straw and other trash from the surface of the ground. The resistance of the relatively flat sweep blades in the soil is comparatively small and it is therefore possible to utilize implements capable of traversing a rather wide section of a field in a single operation. The development of increasingly more powerful farm tractors has enhanced the capability for operating wide implements of this type, the implements often carrying a number of soil-working blades.

The advent of such wide implements has created problems arising from the uneven terrain encountered in farming operations. At any given time, one section of the implement may be traversing soil at a substantially different elevation from that traversed by another section due to variations in contour of the land. This may result in the undesirable situation wherein certain of the sweep blades operate at greater depths than others, causing uneven working of the soil as well as straining of various parts of the implement.

Efforts have been made to compensate for the contour variations by providing composite plow frames comprising articulated frame units hinged for flexing to generally follow the contour of the ground traversed by the implements. These frames are conventionally supported by wheels carried by shafts mounted to the frame units.

These efforts to compensate for uneven contour have not been entirely successful, however, because of the effects which the relatively wide sweep blades have had on the frames of hinged construction. An imbalance of forces on the respective blades has a tendency to compound itself by forcing one side of the blade more deeply into the soil, resulting in the other side of the blade being forced out of the soil. This, in turn, causes the implement frame to buckle at the joint where it is hinged to an adjacent frame unit. Similarly, any free movement in the support structure or in the hinged connection of the frame units which permits the frame to flex at the hinges independently of the elevations of the wheels, results in an inclination of the sweep blade causing an imbalance of forces thereon. As a result, even greater buckling of the frame occurs.

Although some implements have been constructed which have frames and supporting structure intended to maintain the blades at uniform operating depths, these implements have not adequately solved the problem because of complicated wheel and shaft assemblies subject to wear at the joints, resulting in "play" in the supporting structure which caused an imbalance of forces on the sweep blades.

The implements heretofore presented, with their complicated compensating support structures, have been of substantially unitary construction, incapable of having sections added to or removed from the implement for selectively varying the width thereof to adapt the implement to varied tillage requirements.

Accordingly, it is the most important object of this invention to provide a sweep-blade plow which is flexible for uniformly tilling the soil and which may be readily varied in size to suit the tillage requirements without adversely affecting the stability of the implement.

Another very important object of the instant invention, and attainable in the achievement of the foregoing object, is to provide a plow having sections including identical frame units and which may be combined with shafts having one, two or no wheels so that an implement having an optimum number of sections to fulfill the tillage requirements and the necessary wheels for supporting the frame may be readily assembled from a minimum number of parts.

A further object of the present invention is to provide an implement of rugged construction having a few wearing parts to minimize play in the supporting structure and thereby reduces the tendency for the frame units to buckle.

Still a further object of the instant invention is to provide easily removable wearing parts which may be quickly replaced when worn, to insure frame stability.

Yet another object of this invention is to provide a plow having novel means for adjusting the disposition of the blade relative to the frame to control the operation of the blade in the soil.

Another object of the invention is to provide a plow having a novel link assembly for attachment of the power cylinder assembly to the implement to facilitate installation of the power cylinder assembly to the implement when the latter is to be used.

Still other objects of the invention will be pointed out or become apparent as the specification progresses.

In the drawings:

FIGURE 1 is a plan view of a sweep-blade plow embodying the principles of the present invention;

FIG. 2 is a fragmentary, end elevational view of the plow;

FIG. 3 is a vertical, cross-sectional view taken along irregular line 3—3 of FIG. 1, parts of the plow appearing in elevation;

FIG. 4 is an enlarged, plan view taken along line 4—4 of FIG. 3;

FIG. 5 is a detailed, vertical, cross-sectional view taken along line 5—5 of FIG. 4, components of the hitch appearing in elevation;

FIG. 6 is an enlarged, plan view taken along line 6—6 of FIG. 3;

FIG. 7 is a detailed, vertical, cross-sectional view taken along line 7—7 of FIG. 6, parts of the beam and the coulter mount appearing in elevation;

FIG. 8 is an enlarged, detailed, vertical, cross-sectional view taken along line 8—8 of FIG. 1, parts being shown in elevation;

FIG. 9 is an enlarged, vertical, cross-sectional view taken along line 9—9 of FIG. 1;

FIG. 10 is an enlarged, central, vertical, cross-sectional view through a shaft arm and link assembly;

FIG. 11 is an enlarged, fragmentary, horizontal, cross-sectional view through a frame hinge;

Figure 12:
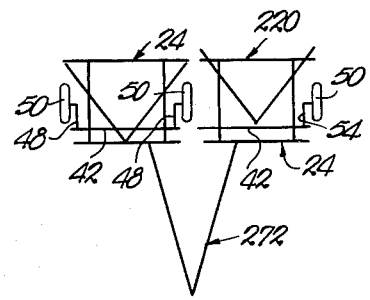
FIG. 12 is a schematic diagram illustrating the plan of one embodiment of the implement comprised of two basic frame units.

A plow embodying the principles of the instant invention is broadly designated 20 in FIGS. 1, 2 and 3 and comprises a plurality of interconnected sections 22. Each section 22 includes a generally horizontally disposed frame unit 24 comprising a rectangular, horizontally extending end member 26 which extends transversely across unit 24, and a similar end member 28 extending parallel with member 26 and at the rear of unit 24. The members 26 and 28 are interconnected with fore and aft side members broadly designated 30 and comprise a member 32 secured to the member 28 and extending in a plane therewith, the members 32 terminating in horizontally spaced relationship from member 26 as best shown in FIG. 9.

A short member 34 for each member 32 is rigidly attached to the underside of member 26 and is secured in overlapping relationship with the undersurface of the members 32 to define notches 36 in the plane of the members 26, 28 and 32.

Each of the frame units 24 for the implement 20 is identical and each is provided with means for swingably hinging the unit 24 with an adjacent unit. Thus, the end members 26 and 28 are provided with hinge components 38 at one end thereof, and components 40 at the other end thereof, it being understood that the components 38 are engageable with the components 40 of an adjacent unit 24 for interconnecting the units for swinging about a generally horizontal fore and aft axis.

Referring to FIG. 1, means for supporting the plow 20 includes a transversely extending shaft 42 for each unit 24, the shaft 42 being received in the notches 36 thereof and journaled therein in bearings 44 which are clamped in the notches 36 by an overlying plate 46 which is releasably secured to the members 32 and 26 by bolt means or the like.

As may best be seen in FIG. 1 of the drawings, all of the shafts 42 for the sections 22 (and denominated 22a, 22b, 22c, 22d, and 22e in FIG. 1) are identical. However, the various shafts 42 may be provided with wheel means, the particular type of wheel means secured to a respective shaft 42 depending upon the location of that shaft 42 with respect to the entire implement 20. Thus, it may be noted that the shaft 42 for section 22c, which is centrally disposed of the implement 20 chosen for illustration and comprising five sections 22, has a pair of radially extending arms 48 secured thereto, each arm having a wheel 50 journaled thereon proximal the outer end of the arm 48.

Additionally, the shaft 42 for the central section 22c has a pair of rings 52 rigidly secured thereto in circumscribing relationship therewith and disposed adjacent the bearings 44 of section 22c to prevent any lateral movement of the shaft 42. In contrast to the shaft 42 for section 22c, the shafts 42 for each of sections 22a and 22b are each provided with a radially extending arm 54 proximal the end thereof closest to the corresponding outer end of plow 20.

It will be noted that a wheel 50 is disposed adjacent the outermost extremity of plow 20 and another wheel 50 is disposed adjacent the axis of hinging between sections 22a and 22b. The shafts 42 for sections 22d and 22e are secured in their respective bearings 44 with the arms 54 thereof secured to the shafts 42 at the ends thereof closest the other end of plow 20. Similarly, the wheels 50 for sections 22d and 22e are located adjacent the axis of the hinged connection between sections 22d and 22e and the outermost extremity of plow 20 respectively. It should be noted that the wheels 50 for central section 22c are located adjacent the axis of the hinged connection between the central section 22c and the two adjacent sections 22b and 22d.

Each of the shafts 42 has a yoke 56 secured thereto, the opposed yokes 56 for adjacent shafts 42 being interconnected by a cross 58 to comprise a universal joint 60 intercoupling the shafts 42. It should be noted that the universal joints 60 are located on the axes of swinging connection between the corresponding adjacent section 22. This permits flexing of the articulated frame assembly of plow 20 about the axes of hinged connection between the sections 22, yet secures the shafts 42 for rotation together so that the wheels 50 are maintained in predetermined spaced relationship from the units 24 at all times.

Referring to FIGS. 3 and 10, it will be noted that the arms 48 for central section 22c each have a pair of spaced-apart, rearwardly extending plates 62 rigidly secured to the rear surface of arm 48 and journaling a transverse shaft 64 in aligned apertures in the plates 62. A link 66 has one end thereof secured to the shaft 64, and a rearwardly extending flange 68 having an aperture therethrough is secured near the other end of link 66.

An extensible rod 70 of a fluid piston and cylinder assembly 72 is pivotally secured to the flange 68, while the opposite end of assembly 72 is pivotally secured to a bracket 74 carried by a frame broadly designated 76. Frame 76 includes a cross member 78 supported at each end by a triangular brace 80 carried by the fore and aft members 30 of the unit 24 and secured thereto by U-bolts 82. It will be noted in FIG. 10 that link 66 is prevented from swinging on shaft 64 by a latch, broadly designated 84, and including a bar 86 engaging the lowermost extremity of link 66 for holding the latter against arm 48. Bar 86 is pivotally coupled to the leading surface of arm 48 by a pair of arms 88 pivoted in a ring 90 welded to arm 48. A spring 92 biases bar 86 into position engaging link 66 as shown in FIG. 10.

Each unit 24 is adapted to carry a tillage tool thereon and, to this end, is provided with a fore and aft extending beam 94. Each beam 94 comprises a pair of elongated, parallel, horizontally spaced, fore and aft angle members 96 having a flange 98 disposed substantially vertically to present a slot 100 therebetween. A substantially upright standard 102 extends into slot 100 and has the uppermost end thereof secured therein by bolts 104 in aligned apertures 106 in flanges 98.

An angle between 108 is welded to the upper flanges 110 of members 96 and extends across beam 94 with the rear surface of the vertical flange engaging the forward surface of the end member 28 of the unit 24. A second angle member 112 is welded to the rearmost extremities of the members 96 and extends across the rear of beam 94 with a plate 114 welded to the upper horizontal flange of member 112, as best shown in FIGS. 2, 3 and 8. Vertically extending bolts 116 on either side of beam 94 secure plate 114 to a plate 118 on the upper surface of member 28 for supporting the rearmost end of beam 94. An adjustment bolt 120 is threaded in an aperture (not shown) extending through plates 114 and member 112 with the head of bolt 120 engaging the bottom surface of member 28 as shown in FIG. 8. It will be understood that a bolt 120 is provided on each side of beam 94 substantially underlying plates 118. The bolts 120 serve to adjust the spacing between the rear of beam 94 and member 28. If desired, a lock nut 122 is engaged on bolt 120 for preventing inadvertent shifting of the latter.

A clamp 124 on member 26 proximal the forward end of beam 94 includes an upper plate 126 on the upper surface of member 26, and a lower plate 128 held on the lower surface of member 26 by bolts 130 extending between the plates 126 and 128 on either side of member 26. Plate 126 extends forwardly from member 26 and is provided with an aperture 132 which receives a bolt 134 extending through slot 100 in beam 94.

Bolt 134 includes a head 136 engaging the lowermost edges of the vertical flanges 98 of members 96. A lug 138 rigidly secured in head 136, extends into slot 100 in horizontally-spaced relationship from the axis of bolt 134 to prevent the latter from turning in slot 100.

A plate 140 extends across slot 100 and engages the horizontal flanges 110 of the members 96, while a nut 142 threaded on bolt 134 engages plate 140 for securely fastening bolt 134 to beam 94. Nuts 144 threaded on bolt 134 on either side of plate 126, adjustably secure beam 94 to member 26. Manifestly, vertical shifting of bolt 134 may be utilized for accomplishing the raising or lowering of the forwardmost end of beam 94.

A bar 146 is rigidly welded to the lowermost surface of plate 126 in depending relationship therefrom and extends into slot 100, as best shown in FIG. 7. Bar 146 serves to stabilize the front end of beam 94 by preventing lateral shifting of the latter. A pair of bolts 167 and 168 extending through the vertical flanges 98 of members 96 on either side of bar 146 serve to clamp the angles 96 tightly against bar 146 after the beam 94 has been raised or lowered to the desired position. A V-shaped sweep blade 148 of conventional construction is mounted on the lowermost end of standard 102 and is adapted to be engaged into the soil for tilling the latter.

Provision is made for mounting a rolling coulter 150 on each beam 94 in front of the respective blades 148. Each coulter 150 includes a coulter mount broadly designated 152 and including a generally horizontally disposed plate 154 having a pair of parallel, upright plates 156 secured to the upper surface thereof, and a depending axle 158 secured to the lower surface thereof in horizontally spaced relationship from the plates 156.

Axle 158 is adapted to receive the vertical hub of a yoke 160 having a coulter wheel 162 journaled thereon as is conventional, it being understood that the yoke 160 is swingable on axle 158 about a vertical axis. A centrally disposed, vertically extending flange 164 on the outer surface of each of the plates 156 is adapted to be engaged on the forwardmost ends of the corresponding members 96 as shown in FIGS. 2, 3 and 6. A U-bolt 166 extends around a bolt 168 through vertical flanges 98 of members 96 and passes through a plate 170 engaging the outer edges of plates 156 for clamping the coulters 150 to the corresponding beams 94. The central disposition of flanges 164 permits the clamping of plates 156 against the members 96 with the axle 158 disposed either to the rear of plates 156 or forwardly of plates 156 as may be desired.

It is ordinarily desirable that the coulter wheel 162 be spaced a predetermined distance forwardly of the corresponding sweep blades 148 for most effective operation. Additionally, it is conventional to locate the adjacent sweep blades 148 in staggered relationship, certain of the blades 148 being spaced more forwardly of their respective frame units 24 than other blades. Accordingly, the disposition of the particular coulter mount 152 will be dictated by the location of the corresponding sweep blade 148.

The hitch 172 for plow 20 includes an elongated member 174 having one end thereof rigidly secured to the member 26 of section 22b, and an elongated member 176 rigidly secured to the member 26 of section 22d. The members 174 and 176 converge as the outermost extremities thereof are approached and the outermost end of member 176 is secured to member 174 by joint means 178. Joint 178 includes a pair of horizontally disposed, vertically spaced plates 180 having spaced socket members 182 secured thereto. A semispherical ball 184 is rotatably carried in a collar 185 which is rigidly secured to the end of member 176 and ball 184 is received between members 182 to provide a flexible coupling between members 174 and 176. It will be understood that suitable pin means 183 extending through aligned apertures in plates 180, members 182 and ball 184 pivotally couple the latter to the members 182 and plates 180.

An upright rod 186 is carried in the uppermost end of pin 183 and is configured to present a holder for stabilizing the hydraulic hoses extending from assembly 72 to a prime mover such as a tractor or the like. A pair of mutually parallel, depending flanges 188 secured to the undersurface of the lowermost plate 180 receives opposed ends of a horizontally extending bolt 190 for pivotally coupling a T-shaped adjusting hitch member 192 to the members 174 and 176. Bolt 190 is tightened to clamp member 192 in position between flanges 188.

An upright bolt 194 has a bifurcated end thereof pivotally coupled to member 192 by a bolt 195 and the other end extending through an aperture 196 in the upper plate 180. Suitable nut means 198 engaged upon bolt 194, locks the member 192 in any predetermined position with respect to plate 180. Bolt 195 may then be tightened to clamp the legs of bolt 194 to member 192 for holding the latter securely in position. Thus, member 192 is firmly clamped to help restrict any motion thereof which might be caused by load fluctuations at the hitch. This serves to reduce wear at these highly stressed points.

A clevis 200 adapted to be coupled to the tractor is pivotally attached to the outermost end of member 192 through a series of vertically spaced apertures 202 in member 192. The apertures 202 provide for vertical adjustment of the height of hitch 172 and finer adjustment thereof may be accomplished by the shifting of bolt 194. A pair of horizontally spaced, depending bars 204 secured to plates 180 and depending therefrom on either side of the member 192, serves to stabilize the latter and prevent lateral shifting thereof.

Referring now to FIG. 11, it may be seen that the hinge components 40 on members 26 are provided with replaceable bushings 206 in the aligned apertures thereof. No such bushings are necessary in the interengaging hinge components 38 on the adjacent member 26 because the hinge pin 208 is prevented from rotation relative to the component 38 by pin or bolt means 210 extending through an aperture in one end of pin 208 and into an aligned aperture in component 38. Thus, the relative movement between pin 208 is restricted to component 40 so that all of the wear resulting from relative movement between the adjacent sections occurs in pin 208 and in the components 40. When sufficient wear has occurred from such relative movement to cause an appreciable amount of play between the units 24, the bushings 206 and the pin 208 may be quickly and easily replaced.

Figure 13:
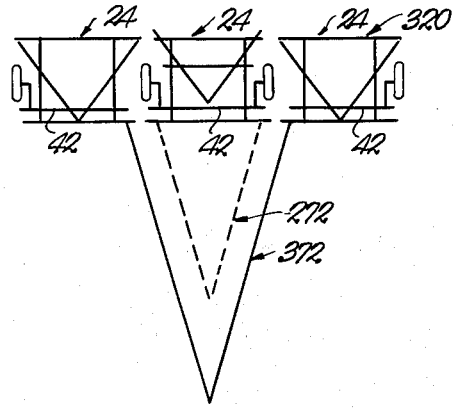
FIG. 13 is a schematic diagram illustrating the plan of an implement comprised of three frame units, an alternate hitch arrangement thereof appearing in dashed lines.
Figure 14:
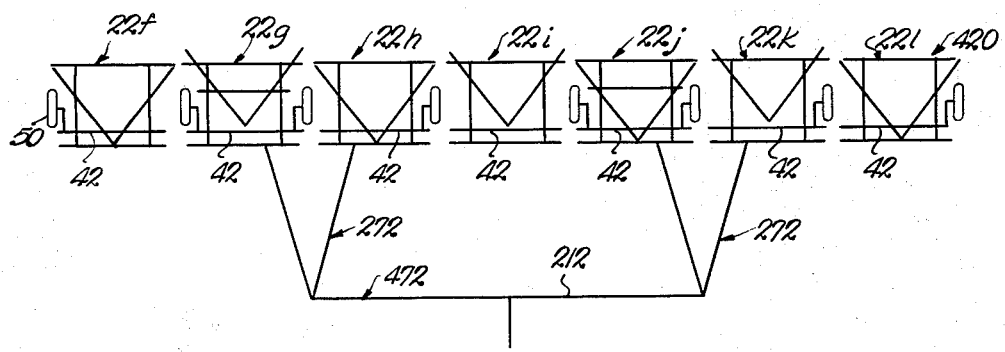
FIG. 14 is a schematic diagram illustrating the plan view of an implement comprised of seven frame units.

It will be readily apparent to those skilled in the art that plow 20 may be comprised of any number of sections 22, the composition thereof depending upon the particular tillage requirements and the power available. In FIGS. 12–14 schematic representation has been made of other ways in which the various sections 22 may be integrated to present plows having different operating capabilities.

Referring initially to FIG. 12, it may be seen that the plow 220 therein represented comprises a pair of mutually interconnected frame units 24. Although the units 24 are identical, one of the units 24 is provided with a shaft 42 having two arms 48 thereon, while the adjacent unit 24 has a shaft 42 having but a single wheel arm 54. Thus, the implement 220 is provided with a wheel 50 adjacent the opposed extremities thereof, and a wheel 50 in proximal underlying relationship to the axis of relative swinging between the units 24.

It should be noted that the hitch 272 for implement 220 is of the same general construction as hitch 172 for implement 20. However, hitch 272 is somewhat smaller and is secured to adjoining units 24.

Referring now to FIG. 13, it may be seen that the plow 330 is comprised of three units 24. The central unit 24 is provided with a shaft 42 mounting two wheels 50 thereon, whereas each of the outer units 24 are provided with shafts 42 having but a single wheel 50 on each shaft. Thus, the implement 320 also has a wheel adjacent the opposed extremities thereof and a wheel adjacent the axis of hinged connection between the respective sections of the plow 320. The hitch 372 may be identical to hitch 172, or hitch 272 may be used attached only to the central unit 24 as shown in dashed lines in FIG. 13.

The versatility of implements constructed pursuant to the principles of this invention is further graphically illustrated by the implement 420 shown schematically in FIG. 14. There, a total of seven sections 22 (denominated 22f–22L) are integrated to present a plow capable of traversing a relatively wide strip of ground in a single operation. It should be noted that sections 22g and 22j are provided with shafts 42 having two wheels integral thereon, whereas sections 22f, 22h, 22k and 22L each are provided with shafts 42 having but a single wheel on each shaft. The wheels 50 are arranged so that there is a wheel 50 adjacent the opposed ends of plow 420 and a wheel adjacent the axis of hinged interconnection of the respective sections 22.

The provision of two sections 22, each having two wheels on their respective shafts 42, eliminates the necessity for the provision of any wheels on the shaft 42 for the centrally diposed section 22i. The entire weight of section 22i is supported by the adjacent sections 22h and 22j through the hinged connection therewith. Thus, shaft 42 for section 22i serves merely to interconnect the shafts 42 for section 22h and 22j so that all of the shafts 42 for implement 420, rotate together. The hitch 472 for implement 420 comprises a pair of hitch units 272, each interconnecting a pair of sections 22. The units 272 are interconnected by a crossbar 212 adapted to be coupled with the tractor for pulling implement 420.

Figure 15:
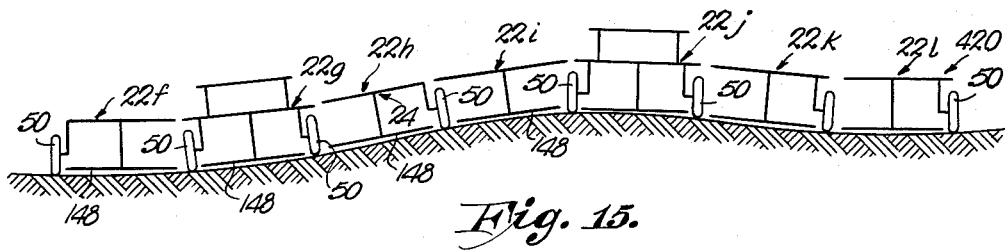
FIG. 15 is a schematic diagram illustrating the front elevation of the implement of FIG. 14 showing the relative disposition of the sections thereof as the implement traverses uneven ground.

The flexibility of implements utilizing the frame construction of this invention is graphically illustrated in FIG. 15 wherein the implement 420 is shown in elevation traversing relatively uneven terrain. It may be seen that each of the sections 22f–22L is supported by the wheels 50 at uniform heights above the surface of the ground traversed by the respective sections 22. Although the hinged construction permits flexing of the frame assembly so that the implement 420 conforms substantially to the configuration of the contour of the ground, the shafts 42 are prevented from rotation by the power cylinder assemblies. The intercoupling of all of the shafts 42 preclude the necessity for a power cylinder assembly for each section 22 and cause all of the shafts 42 to rotate together when more than one unit 24 is provided with a power cylinder assembly. The supporting of the frame units 24 for each section 22 at a uniform distance above the ground, insures that the blade 148 of each section 22 is constantly maintained at a uniform working depth in the soil.

In operation, each implement 20, 220, 320 and 420 may be shifted to dispose the respective blades 148 into the soil merely by activating the assemblies 72 to rotate the interconnected shafts 42 for swinging the wheels 50 in a direction for supporting the frame units 24 in closer disposition with respect to the ground. This lowers the blades 148 for each section 22 into engagement with the soil. The amount of rotation of the shafts 42 determines the depth at which the blade 148 is permitted to operate. When the implements traverse relatively uneven soil, the flexing of the frame assembly thereof through the hinged interconnections between the sections 22 of the implement insure that the respective blades 148 are maintained at a uniform working depth at all times.

When the implement has reached the end of a field or the like, the blades 148 may be shifted out of engagement with the soil simply by operating the assemblies 72 for rotating the respective shafts 42 in the opposite direction thereby elevating the frame units 24 to lift the blades 148 from the ground.

The construction of sweep blade plows pursuant to the principles of this invention is particularly advantageous in that each wheel 50 is mounted on an arm 54 or 48 which may be welded integrally with the corresponding shafts 42. There is no linkage between the wheels 50 and the shafts 42 which may become loose through wear and which would permit spurious swinging of the frame units 24 with respect to the adjacent units 24.

The problems encountered from worn linkage is particularly pronounced in sweep blade plows wherein even slight swinging of one unit with respect to the other and not caused by uneven terrain, may cause one side of the sweep blade 148 to dig more deeply into the ground than the other side. This causes an increased pressure on the side of the blade 148 disposed more deeply into the soil which causes that side of the blade 148 to dig further into the ground. This has a tendency to cause the blade 148 to incline out of its normally level position and cause a withdrawal of the other side thereof from the ground. Such an inclination of the blade 148 has a tendency to cause the frame assembly to buckle about the axis of hinged interconnection between the particular section 22 and the adjacent section 22. Such buckling may pull the adjacent blades from the ground resulting in improper tilling of the soil by the implement. Further, this imparts strains to various components of the implement which are undesirable.

The tendency for buckling of the sections 22 is held to a minimum by the construction described herein wherein play between the components of the implement is virtually eliminated. Any wear between the moving parts occurs in the bearings 44, universal joints 60, and bushings 206. These are removable and may be easily replaced.

The versatility of the tillage implement constructed pursuant to this invention should not be overlooked. The interchangeability of the shafts 42 in the frame units 24 permit the make-up of an implement having the optimum number of sections 22 to provide for the tillage requirements of the soil to be traversed by the implement. Further, a farmer may buy only sufficient components for constructing an implement capable of traversing a maximum strip of ground consistent with his power capabilities. Then, if it is desired, because of soil conditions or the like, to utilize an implement having less sections 22, such an implement may be constructed without the need for additional parts.

It should be emphasized that the shafts 42 are completely removable from the frame units 24 and that each shaft 42 may be substituted for any other shaft 42 in order to dispose the wheels 50 in positions for properly supporting the frame assembly. Also, it should be recognized that the braces 80 are readily removable from the members 30 so that the frames 76 can be mounted on any frame unit 24 consistent with providing suitable assemblies 72 for imparting rotational torque to the shafts 42. The desirable results obtained by using an implement constructed from a plurality of frames 24 is partially achieved by virtue of the fact that the blades 148 are mounted in generally side-by-side relationship thus minimizing the front-to-rear distance of the plow 20. This permits the traversing of relatively uneven ground without there being a substantial difference in elevation between the ground engaged by the forwardmost points of the blades 148 and the rearwardmost portions thereof. Thus, the blades are maintained at a substantially uniform depth throughout the front-to-rear length thereof. This assists in maintaining the forces on all portions of the blades substantially balanced to prevent any tendency of the blades to be forced from the ground.

Having thus described the invention, what is claimed as new and desired to be secured by Letters Patent is:

1. An agricultural implement comprising:
an articulated frame assembly comprising a plurality of identical planar, normally generally horizontal frame units disposed in side-by-side relationship, at least certain of said units being adapted to carry a tillage tool, each unit comprising a pair of spaced members aligned, extending transversely of the line of draft of the implement and at least one fore and aft member interconnecting the transverse members;

hinge means swingably interconnecting each unit with an adjacent unit for rotation about a fore and aft, generally horizontal axis, the hinge means comprising hinge components at each of the ends of each transverse member and operable to interconnect the latter with the hinge components on the corresponding member of the adjacent unit;

a shaft rotatably carried by each unit and extending transversely thereacross, the axes of said shafts being disposed in a straight line when the units are horizontal;

a universal joint member on each end of each shaft for intercoupling opposed adjacent shafts and with the axes of movement thereof lying within respective parallel planes extending fore and aft of the implement whereby any number of units may be positioned in side-by-side relationship and interconnected by corresponding hinge means and the universal joint members;

ground-engageable wheel means secured to at least certain of said shafts for supporting said frame assembly and including a wheel between each of the frame units adjacent the hinge means interconnecting the same; and means mounted on said assembly and coupled to at least one of said shafts for rotating said shafts in unison and thereby simultaneously move all of the wheels vertically with respect to said frame units.

2. An implement as set forth in claim 1 wherein the frame members of each unit, the hinge means thereon, and the corresponding shaft are all disposed in a common plane.

3. An implement as set forth in claim 1, wherein each unit includes a pair of spaced fore and aft members interconnecting said transverse members, each of said fore and aft members being provided with notch means therein, said shafts being received in respective notch means and lying substantially in a common plane with said members.

References Cited by the Examiner

UNITED STATES PATENTS

| | | | |
|---|---|---|---|
| 188,732 | 3/1877 | Farquhar | 172—762 |
| 206,334 | 7/1878 | Jarrell | 172—744 |
| 210,588 | 12/1878 | Welling | 172—744 |
| 336,508 | 2/1886 | Burk | 172—762 |
| 1,282,124 | 10/1918 | Phillips | 111—52 |
| 1,444,572 | 2/1923 | Thomason | 172—658 |
| 1,732,724 | 10/1929 | Key | 172—658 |
| 1,837,526 | 12/1931 | Botsford | 172—310 X |
| 1,938,132 | 12/1933 | Broemmelsick et al. | 172—310 X |
| 2,641,886 | 6/1953 | Graham. | |
| 2,828,680 | 4/1958 | Johnson | 176—456 X |
| 2,985,247 | 5/1961 | Oehler et al. | 172—413 |
| 3,051,252 | 8/1962 | Andersen et al. | 172—629 X |
| 3,055,530 | 9/1962 | Mundhenke | 172—105 X |
| 3,065,803 | 10/1962 | Pierson | 172—413 |
| 3,154,151 | 10/1964 | Zimmer et al. | 172—456 |
| 3,173,497 | 3/1965 | French | 172—456 |

FOREIGN PATENTS

| | | |
|---|---|---|
| 108,555 | 9/1939 | Australia. |
| 565,118 | 10/1958 | Canada. |
| 945,028 | 4/1949 | France. |
| 46,109 | 5/1888 | Germany. |
| 552,490 | 10/1928 | Germany. |
| 792,939 | 4/1958 | Great Britain. |

ABRAHAM G. STONE, *Primary Examiner.*

T. GRAHAM CRAVER, *Examiner.*

J. R. OAKS, *Assistant Examiner.*